United States Patent Office 2,791,585
Patented May 7, 1957

2,791,585

STEROID α-HALO KETALS

Barney J. Magerlein and A Vern McIntosh, Jr., Kalamazoo, and Robert H. Levin, Kalamazoo Township, Kalamazoo County, Mich., assignors to The Upjohn Company, Kalamazoo, Mich., a corporation of Michigan No Drawing. Application December 6, 1955,
Serial No. 551,238

9 Claims. (Cl. 260—239.55)

This invention relates to certain steriod α-halo ketals and more particularly to novel 3-ketals of 4-halo-17α,21-dihydroxypregnane-3,21-diones which contain an oxygen substituent in the 11-position, and 21-acylates thereof. The compounds of the invention may be represented by the following general formula:

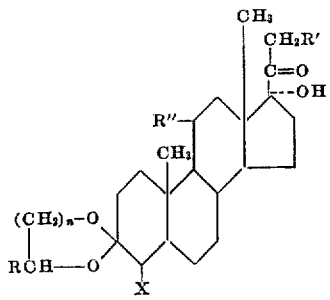

wherein X is a halogen of atomic weight from 35 to 80, i. e., chlorine or bromine, and wherein R is selected from the group consisting of hydrogen and lower-alkyl groups such as, for example, methyl, ethyl, propyl, isopropyl, butyl, 1-methylpropyl, amyl, hexyl, and the like, $n$ is an integer from one to two, inclusive, and R' is hydroxy or an acyloxy group, the acyl radical of which is that of a hydrocarbon monocarboxylic acid, preferably containing from one to eight carbon atoms, inclusive, such as acetoxy, propionoyloxy, butyroyloxy, valeroyloxy, hexanoyloxy, heptanoyloxy, octanoyloxy, benzoyloxy, and others, and R'' is an oxygen substituent, e. g., α- or β-hydroxy or keto.

The compounds of this invention find use as intermediates in the preparation of known pharmaceutically active compounds such as cortisone and hydrocortisone and 21-acylates thereof. For example, Kendall's compound F acetate is prepared from a 4-halo-11β,17α-dihydroxy-21-acetoxypregnane-3,20-dione 3-monoketal by treatment with 2,4-dinitrophenylhydrazine in the presence of sulfuric acid, which results in the formation of the 3-(2,4-dinitrophenylhydrazone) and the elimination of hydrogen halide to form a double bond between carbon atoms four and five and give 11β,17α-dihydroxy-21-acetoxy-4-pregnene-3,20-dione 3-(2,4-dinitrophenylhydrazone). Removal of the hydrazone group with pyruvic acid gives Kendall's compound F acetate. Likewise, free Kendall's compound F is prepared from a 4-halo-11β,17α,21-trihydroxypregnane-3,20-dione 3-monoketal by treatment with 2,4-dinitrophenylhydrazine in the presence of sulfuric acid followed by removal of the hydrazone group with pyruvic acid.

The compounds of the present invention can be made by reacting 4-halo-17α-hydroxy-21-acyloxypregnane-3,11,20-triones, 4-halo-11α,17α-dihydroxy-21-acyloxypregnane-3,20-diones or 4-halo-11β,17α-dihydroxy-21-acyloxy-pregnane-3,20-diones in which the 21-acyl radical is that of a hydrocarbon monocarboxylic acid containing from one to eight carbon atoms, inclusive, with an alkylene glycol, preferably an alkane-1,2-diol or an alkane-1,3-diol such as, for example, ethylene glycol, propane-1,2-diol, propane-1,3-diol, butane-1,2-diol, pentane-1,2-diol, 3-methylpentane-1,2-diol, hexane-1,3-diol, octane-1,2-diol and the like in the presence of an acid catalyst, preferably a mineral acid or an organic sulfonic acid. Representative catalysts are the meta- and para-toluenesulfonic acids, napthalenesulfonic acid, benzenesulfonic acid, orthochlorobenzenesulfonic acid, hydrochloric acid, and sulfuric acid, with para-toluenesulfonic acid being the preferred acid catalyst. The ketalizing reaction can be conducted in any organic solvent with which the reactants and products are non-reactive such as, for example, benzene, toluene, xylene, methylene chloride, petroleum ether, ether, or the like. However, the preferred solvents are those which form an azeotrope with water and afford a means of removing the water as it is formed in the course of the reaction. For this reason the reaction is usually conducted at the reflux temperature of the mixture, such temperature depending, of course, upon the solvent and the particular reaction conditions, e. g., pressure, employed.

The ketalizing reaction is carried out at a temperature below about 200 degrees centigrade, preferably under reflux conditions, to cause conversion of the 3-ketone group to a ketal group. In carrying out the reaction the 4-halo-17α-hydroxy-21-acyloxypregnane-3,20-dione containing an oxygen substituent in the 11-position is mixed with at least the theoretical amount of the alkane-1,2-diol or alkane-1,3-diol in an organic solvent at a temperature between about twenty and about 200 degrees centigrade, preferably between about twenty and about 150 degrees centigrade. Ordinarily, it is preferred to use an excess of the alkanediol, preferably between about two and about 25 moles per mole of the steroid. The time required for the reaction is not critical and may be varied between about one and about 24 hours, the length of time being somewhat dependent upon the temperature, the ketalizing reagent and the catalyst employed, as will be apparent to one skilled in the art.

The foregoing reaction provides for the preparation of 4-halo-17α-hydroxy-11-oxygen-substituted-21-acyloxy-3,20-dione 3-monoketals. The corresponding free 21-hydroxy compound, i. e., the 4-halo-17α,21-dihydroxy-11-oxygen-substituted-pregnane-3,20-dione can be prepared by hydrolysis under mild hydrolyzing conditions as for example, with dilute alkali at approximately room temperature.

The novel compounds of this invention can also be prepared in accordance with the method disclosed in application Serial No. 304,852, filed August 16, 1952, of which this application is a continuation-in-part. According to the disclosure of that application, a 4-halo-11β,17α-dihydroxypregnane-3,20-dione 3,20-diketal, a 4-halo-11α,17α-dihydroxypregnane-3,20-dione 3,20-diketal or a 4-halo-17α-hydroxypregnane-3,11,20-trione 3,20-diketal is selectively hydrolyzed with an acid hydrolyzing agent to produce the corresponding 3-monoketal. These monoketals thus produced are then reacted with bromine to produce the corresponding 21-bromo monoketals, as for example, 4-halo-21-bromo-11β,17α-dihydroxypregnane-3,20-dione 3-monoketal or 4-halo-21-bromo-17α-hydroxy-pregnane-3,11,20-trione 3-monoketal. The 21-bromo-3-monoketals are then reacted with an alkali-metal salt of a hydrocarbon monocarboxylic acid containing from one to eight carbon atoms, inclusive, together with an alkali-metal iodide, preferably in the presence of the free acid corresponding to the alkali-metal salt to produce the 4-halo-11-oxygen-substituted-17α-hydroxy-21-acyloxy-pregnane-3,20-dione 3-monoketal, the acyl group corresponding to that of the alkali-metal salt.

The alternative methods of preparation of the compounds of this invention, i. e., the direct ketalization of the 3,20-dione compound possessing a 21-acyloxy group and the selective hydrolysis of the 3,20-diketal in which the 21-carbon is unsubstituted followed by bromination and introduction of the acyloxy group each have separate advantages. For example, the latter method permits the use of an original starting material which is in comparatively more abundant supply, i. e., 3α,17α-dihydroxypregnane-11,20-dione [Sarett, J. Am. Chem. Soc., 70 1454 (1948)]. It also has the advantage of embracing an overall process in which the 11-keto group can be transformed to the 11β-hydroxy group while the 3- and the 20-keto groups are protected by ketalization.

The starting 4-halo-3,20-diketal compounds are prepared by reacting a 4-halo-3,20-diketone such as 4-chloro-17α-hydroxypregnane-3,11,20-trione or 4-chloro-11β,17α-dihydroxypregnane-3,20-dione with an alkanediol as previously described in connection with the monoketalization of a 4-chloro-21-acyloxy-3,20-dione, using instead preferably five to about fifty moles of alkanediol per mole of steroid. The ketalizing reaction can be conducted in any organic solvent with which the reactants and products are non-reactive as previously described.

Reduction of the 11-keto group of the 4-halo-17α-hydroxy-pregnane-3,11,20-trione 3,20-diketal is accomplished by mixing said diketal with a reducing agent in the presence of an organic solvent which is non-reactive under the conditions of reaction. Reducing agents such as, for example, lithium aluminum hydride, lithium borohydride, sodium borohydride, hydrogen in the presence of catalysts such as platinum or Raney nickel and others are operative with lithium aluminum hydride being preferred. Solvents such as, for example, ether, benzene, tetrahydrofuran, petroleum ether, and others are satisfactory for the reduction reaction medium. In a preferred embodiment of the reaction, lithium aluminum hydride is admixed with a suitable organic solvent such as ether, the diketal is dissolved in a solvent such as, for example, benzene, and the admixture is then combined to form the reaction mixture. The temperature of the reaction mixture is usually maintained between about zero and 100 degrees centigrade with a temperature between about room temperature and the reflux temperature of the reaction mixture being preferred, where a reaction period varying from about one-half to about eight hours or more, with about two hours being preferred. The ratio of reducing agent to starting steroid can be varied considerably over a wide range, a substantial excess of the reducing agent generally being employed with mole ratios up to fifty to one.

According to the second alternative, i. e., selective hydrolysis of a 3,20-diketal to make the 3-monoketals of this invention, the process is claimed in application Serial No. 304,852, previously referred to. As disclosed in that application the preferential hydrolysis is highly unexpected since it is known that ketal groups are comparatively sensitive, and it would be expected under normal conditions that both ketal groups would be hydrolyzed. However, it is possible preferentially to remove the 20-ketal group of the starting compound while the 3-ketal group remains intact. This is apparently due to the presence of the α-halo ketal moiety of the ketals which affords greater stability to that portion of the molecule. The 3,20-diketal starting material is dissolved in an organic solvent and this solution is admixed with at least a theoretical amount, and preferably an excess, of an acid hydrolyzing agent. The organic solvent can be either of the water-miscible type, such as, for example, acetone, methanol, ethanol, dioxane, and the like, or the organic solvent can be of the water-immiscible type such as, for example, ether, benzene, chloroform, hexane, and the like. If the water-miscible solvent is used, the reaction takes place in a homogeneous system, whereas, if a water-immiscible solvent is utilized, the reaction mixture forms a two-phase heterogeneous system which must be stirred in order to bring the reactants into contact with each other and cause hydrolysis. Ordinarily, it is preferred to use a temperature between about twenty and about forty degrees centigrade in carrying out the reaction, but temperatures as low as zero and as high as 100 degrees centigrade or even higher are operative. The time required for the reaction is not critical and can be varied between about one and about 24 hours, the length of time being dependent on the temperature and the hydrolyzing agent employed. The amount of hydrolyzing agent employed may be varied over a wide range since the acid acts as a catalyst for the reaction. Amounts from a trace to large excess of the hydrolyzing agent are operative. The acid hydrolyzing agent for the process of the present invention is a strong acid such as, for example, sulfuric acid, hydrochloric acid, meta- or para-toluenesulfonic acids, naphthalenesulfonic acid, benzenesulfonic acid, ortho-chlorobenzenesulfonic acid, tri-chloroacetic acid, or the like, with sulfuric acid and hydrochloric acid being the preferred acids. The acid hydrolyzing agent is generally employed as a dilute aqueous solution, and in dilute concentrations. Acid concentrations in the reaction mixture of about 0.1 percent to about twenty percent are preferably employed but lower and higher concentrations are operative. Under these reaction conditions the α-halo ketal group is stable and remains unaffected while hydrolysis of the 20-ketal takes place.

When hydrolysis is substantially complete, the product is isolated by conventional procedure, for example, when the resulting mixture is composed of an organic layer and a water layer, the organic layer is separated, the water layer is extracted with ether, and the organic solutions are combined. The combined extracts are then washed with water and dried using a drying agent such as anhydrous sodium sulfate. Filtration to remove the drying agent and distillation to remove the solvent gives the isolated product, which may be crystallized from any of the common organic solvents. Alternatively, the product can be isolated by diluting the reaction mixture with water until crystallization of the product takes place. If desired, chromatographic purification can be employed.

The 4 - halo - 17α - hydroxy - 11 - oxygen - substituted - pregnane-3,20-dione 3-ketals of this invention, aside from being useful as intermediates in the preparation of Kendall's compound E and compound F and the 21-esters thereof, are likewise useful as convenient derivatives of these pharmaceutically active adrenal cortical hormone compounds for purposes such as purification, storage, isolation from reaction mixtures and the like.

The following examples are illustrative of the process and products of the present invention, but are not to be construed as limiting.

PREPARATION 1.—4 - CHLORO - 17α - HYDROXYPREGNANE-3,11,20-TRIONE

A solution of 25 grams of 3α,17α-dihydroxypregnane-11,20-dione [Sarett, J. Am. Chem. Soc., 70, 1454 (1948)] in 380 milliliters of tertiary-butyl alcohol was admixed with five milliliters of concentrated hydrochloric acid and twelve milliliters of water, and thereafter cooled to about fifteen degrees centigrade. Eighteen milliliters (2.2 molar equivalents) of tertiary-butyl hydrochlorite was then added thereto, whereupon the temperature rose to about 26 degrees centigrade. The reaction mixture was stirred for 4.5 hours although the iodometric titration of an aliquot sample taken from the reaction mixture after two hours showed the reaction to be essentially complete. The volatile components of the reaction mixture were removed by distillation at reduced pressure leaving a 24.59 gram residue (a yield of 90.6 precent of the theoretical, corrected for the samples taken from the reaction mixture for iodometric titrations) of 4-chloro-17α-hydroxypregnane-3,11,20-trione, melting without purification at 220 to 225 degrees centigrade and having an $[\alpha]_D$ of plus 91 degrees (acetone).

The corresponding 4-bromo compound is prepared according to the procedure of Kritchevsky et al. [J. Am. Chem. Soc., 74, 483 (1952)].

PREPARATION 2.—4 - CHLORO - 17α - HYDROXYPREGNANE-3,11,20-TRIONE 3,20-ETHYLENE GLYCOL DIKETAL

A solution of five grams of 4-chloro-17α-hydroxypregnane-3,11,20-trione (from Preparation 1), ten milliliters of ethylene glycol, 0.30 gram of para-toluenesulfonic acid monohydrate and 500 milliliters of benzene was placed in a reaction flask which was equipped with a reflux condenser and a water trap so arranged that the condensed vapors passed through the water trap before returning to the reaction flask. The mixture was heated to reflux and was allowed to reflux for six hours while at the same time being agitated. The water which formed was removed by co-distillation with benzene and was collected in the water trap. The reaction mixture was cooled, washed with a dilute solution of sodium bicarbonate and with water, and then dried and concentrated to dryness under reduced pressure. The white crystalline residue was dissolved in 85 milliliters of ethyl acetate and the solution was cooled until crystallization took place. The crystalline 4-chloro - 17α - hydroxypregnane-3,11,20-trione 3,20-ethylene glycol diketal was isolated by filtration and weighed 1.986 grams; melting point 232 to 236 degrees centigrade. A second crop of 1.928 grams, melting point 232 to 235 degrees centigrade, was obtained by concentration of the mother liquor. The two crops were combined and recrystallized from methylene chloride-hexane, benzene, and ethyl acetate, in that order, to yield purified product of melting point 239 to 242 degrees centigrade; $[\alpha]_D^{23}$ plus 55 degrees (acetone).

Analysis.—Calculated for $C_{25}H_{37}O_6Cl$: C, 64.02; H, 7.95; Cl, 7.56. Found: C, 64.57; H, 7.86; Cl, 7.55.

PREPARATION 3.—4 - CHLORO - 11β,17α - DIHYDROXYPREGNANE-3,20-DIONE 3,20-ETHYLENE GLYCOL DIKETAL

To a solution of thirteen grams of lithium aluminum hydride in one liter of anhydrous ether was added, with stirring, a solution of 13.79 grams of 4-chloro-17α-hydroxypregnane-3,11,20-trione 3,20-ethylene glycol diketal (from Preparation 2) in 200 milliliters of benzene. The reaction mixture was stirred at room temperature for one hour and was then heated at reflux for an additional hour. After cooling, the mixture was hydrolyzed by the cautious addition of a solution of 100 milliliters of hydrochloric acid in 150 milliliters of water. Stirring at room temperature was continued for several hours, after which the organic layer was separated and the water layer was extracted with methylene chloride. The methylene chloride extract was combined with the organic layer and the whole was washed with water and dilute sodium bicarbonate solution, dried and evaporated to dryness. The residue was triturated with ether and yielded 8.38 grams of 4-chloro-11β,17α-dihydroxypregnane-3,20-dione 3,20-ethylene glycol diketal; melting point 212 to 218 degrees centigrade. An additional 1.51 grams was obtained from the mother liquor. Several recrystallizations from a mixture of ethyl acetate-hexane gave purified material melting at 222 to 224 degrees centigrade.

Analysis.—Calculated for $C_{25}H_{39}O_6Cl$: C, 63.74; H, 8.35; Cl, 7.53. Found: C, 63.80; H, 8.30; Cl, 7.35.

Example 1.—4-chloro-11β,17α-dihydroxypregnane-3,20-dione 3-ethylene glycol ketal A solution of one gram of 4-chloro-11β,17α-dihydroxypregnane-3,20-dione 3,20-ethylene glycol diketal (from Preparation 3) in fifty milliliters of acetone containing ten milliliters of water and 0.1 milliliter of sulfuric acid was permitted to stand at room temperature for two hours. The solution was then concentrated under a stream of air, diluted with water, and extracted with ethylene dichloride. The ethylene dichloride extract, after drying, was chromatographed over eighty grams of Florisil (magnesium silicate). The chromatograph was eluted with eighty-milliliter fractions of solvent as indicated below.

| Fraction No. | Solvent | Residue (Weight, mg.) |
| --- | --- | --- |
| 1-3 | ethylene dichloride | 5 |
| 4 | ethylene dichloride plus 4% acetone | 17 |
| 5 | do | 122 |
| 6 | do | 180 |
| 7 | ethylene dichloride plus 6% acetone | 286 |
| 8 | do | 130 |
| 9 | do | 39 |
| 10 | do | 17 |
| 11-14 | ethylene dichloride plus 9% acetone | 17 |
| 15 | ethylene dichloride plus 20% acetone | 20 |
| 16 | do | 12 |
| 17-20 | do | 9 |

Fractions 4–8 (708 milligrams) were combined and recrystallized from ethyl acetate-hexane to give 569 milligrams of 4-chloro-11β,17α-dihydroxypregnane,3,20-dione 3-ethylene glycol ketal; melting point 183 to 185 degrees centigrade. Further recrystallization from ethyl acetate-hexane resulted in purer product of melting point 194 to 196 degrees centigrade (with decomposition); $[\alpha]_D^{23}$ plus 82 degrees (acetone).

Analysis.—Calculated for $C_{23}H_{35}O_5Cl$: C, 64.70; H, 8.26. Found: C, 64.57; H, 8.13.

Example 2.—4-chloro-21-bromo-11β,17α-dihydroxypregnane-3,20-dione 3-ethylene glycol ketal Four hundred milligrams of 4-chloro-11β,17α-dihydroxypregnane-3,20-dione 3-ethylene glycol ketal (from Example 1) was dissolved in fifteen milliliters of chloroform and a total of 3.2 milliliters of bromine in acetic acid was added dropwise and at such a rate as to permit decolorization of each drop before the subsequent drop was added. The solution was then diluted with ether, washed with a cold dilute solution of sodium bicarbonate, and with water, and dried. Removal of the solvent gave 320 milligrams of 4-chloro-21-bromo-11β,17α-dihydroxypregnane-3,20-dione 3-ethylene glycol ketal; melting point 199 to 201 degrees centigrade (with decomposition). Infrared analysis confirmed the structure proposed.

Analysis.—Calculated for $C_{23}H_{35}O_5BrCl$: Total halogen, 22.76. Found: Total halogen, 21.75.

The corresponding 4-bromo compound is prepared from 4-bromo-11β,17α-dihydroxypregnane-3,20-dione 3-ethylene glycol ketal by following the procedure of the above example.

Example 3.—4-chloro-11β,17α-dihydroxy-21-acetoxypregnane-3,20-dione 3-ethylene glycol ketal A mixture of 1.77 grams (0.0035 mole) of 4-chloro-11β,17α-dihydroxy-21-bromopregnane-3,20-dione 3-ethylene glycol ketal (from Example 2), two grams of potassium acetate, fifty milligrams of potassium iodide, and 0.5 milliliter of acetic acid in 300 milliliters of acetone was heated under reflux for sixteen hours. The mixture was filtered and the filtrate was concentrated to dryness under reduced pressure. The residue was dissolved in ethyl acetate, filtered to remove inorganic salts, and was allowed to crystallize. The yield of 4-chloro-11β,17α-dihydroxy - 21 - acetoxyprengane - 3,20 - dione 3 - ethylene glycol ketal was 1.39 grams (84.8 percent); melting point 231 to 234 degrees centigrade. Recrystallization from the same solvent raised the melting point to 232 to 233 degrees centigrade.

Analysis.—Calculated for $C_{25}H_{37}O_7Cl$: C, 61.91; H, 7.69; Cl, 7.31. Found: C, 62.17; H, 7.73; Cl, 7.16.

Following the same procedure as above, other acyloxy groups may be substituted in the 21-position by reaction of 4 - chloro - 21-bromo-11β,17α-dihydroxypregnane-3,20-dione 3-ethylene glycol ketal with the appropriate acylating agent. Such acyloxy groups include propionoyloxy, butyroyloxy, valeroyloxy, hexanoyloxy, heptanoyloxy, octanoyloxy, benzoyloxy, and others. The preferred acyloxy groups are those derived from a hydrocarbon monocarboxylic acid containing from one to eight carbon atoms, inclusive.

In addition, the corresponding 4-bromo compounds are similarly prepared from 4-bromo-11β,17α-dihydroxy-21-bromopregnane-3,20-dione 3-ethylene glycol ketal according to the procedure of the above example.

*Example 4. — 4-chloro-11β,17α,21-trihydroxypregnane-3,20-dione 3-ethylene glycol ketal*

A solution of 100 milligrams of 4-chloro-11β,17α-dihydroxy-21-bromopregnane-3,20-dione 3-ethylene glycol ketal (from Example 2) in fifty milliliters of alcohol and fifty milliliters of 0.1 N sodium hydroxide was permitted to stand at 25 degrees centigrade under nitrogen for ten minutes. The pH was adjusted to seven with dilute hydrochloric acid and the solution was then diluted with 200 milliliters of water and repeatedly extracted with ether. The ether extract was evaporated to dryness and the residue was purified by chromatography over Florisil to yield ten milligrams of 4-chloro-11β,17α,21 - trihydroxypregnane - 3,20 - dione 3 - ethyleneglycol ketal. The structure of this compound, which was not crystalline, was confirmed by infrared analysis.

The corresponding 4-bromo compound is prepared from 4 - bromo - 11β,17α - dihydroxy - 21 - bromopregnane-3,20-dione 3-ethylene glycol ketal by following the procedure of the above example.

*Example 5. — 4-chloro-17α-hydroxypregnane-3,11,20-trione 3-ethylene glycol ketal*

A solution of one gram of 4-chloro-17α-hydroxypregnane-3,11,20-trione 3,20-ethylene glycol diketal (from Preparation 2) in fifty milliliters of acetone is hydrolyzed following the procedure of Example 1 to produce 4 - chloro - 17α - hydroxypregnane - 3,11,20-trione 3-ethylene glycol ketal.

*Example 6. — 4-chloro-21-bromo-17α-hydroxypregnane-3,11,20-trione 3-ethylene glycol ketal*

Following the procedure of Example 2, 4-chloro-17α-hydroxypregnane-3,11,20-trione 3-ethylene glycol ketal of Example 5 is dissolved in chloroform and brominated with bromine to produce 4-chloro-21-bromo-17α-hydroxypregnane-3,11,20-trione 3-ethylene glycol ketal.

*Example 7.—4-chloro-17α-hydroxy-21-acetoxypregnane 3,11,20-trione 3-ethylene glycol ketal*

Following the procedure of Example 3, 4-chloro-17α-hydroxy - 21 - bromopregnane - 3,11,20 - trione 3 - ethylene glycol ketal of Example 6 is treated with potassium acetate, potassium iodide and a small amount of acetic acid to produce 4-chloro-17α-hydroxy-21-acetoxypregnane-3,11,20-trione 3-ethylene glycol ketal.

*Example 8.—4-chloro-21-acetoxy-17α-hydroxypregnane-3,11,20-trione 3-ethylene glycol ketal*

A mixture of 500 milligrams of 4-chloro-21-acetoxy-17α-hydroxypregnane-3,11,20-trione is mixed with two milliliters of ethylene glycol, about fifty milligrams of para-toluenesulfonic acid and 100 milliliters of benzene. The mixture was stirred and heated under reflux for seventeen hours. The water formed in the reaction was co-distilled with the benzene. The benzene solution was washed with sodium bicarbonate, dried and concentrated. Crystallization from 2-propanol gave 150 milligrams (25 percent yield) of white crystals of 4-chloro-21-acetoxy - 17α - hydroxypregnane - 3,11,20 - trione 3 - ethylene glycol ketal. The crystals had a melting point of 207 to 212 degrees centigrade with decomposition. Further crystallization from the same solvent raised the melting point to 228–232 degrees centigrade. Infrared data confirmed the structure of 4-chloro-21-acetoxy-17α-hydroxypregnane-3,11,20-trione 3-ketal.

*Analysis.*—Calculated for $C_{23}H_{31}O_6Cl$: C, 62.93; H, 7.12; Cl, 8.08. Found: C, 61.99, 62.36; H, 7.57, 7.48; Cl, 7.60, 7.56.

*Example 9. — 4-chloro-21-acetoxy-11β,17α-dihydroxypregnane-3,20-dione 3-ketal*

Following the procedure of Example 8, 4-chloro-21-acetoxy-11β,17α-dihydroxypregnane-3,20-dione is reacted with ethylene glycol in a benzene reaction mixture containing a small amount of para-toluenesulfonic acid to produce 4-chloro-21-acetoxy-11β,17α-dihydroxypregnane-3,20-dione 3-ketal.

In the same manner as given in Examples 1 to 5, inclusive, starting with the appropriate 3,20-diketal, other steroid 4-halo-3-monoketals are prepared including 4 - bromo - 11β,17α,21 - trihydroxypregnane - 3,20-dione 3-ethylene glycol ketal, 4-chloro-17α-hydroxy-21-acetoxypregnane-3,11,20-trione 3-butane-1,3-diol ketal, 4-chloro-11β,17α,21-trihydroxypregnane-3,20-dione 3-hexane-1,2-diol monoketal, 4-bromo-11α,17α-dihydroxy-21-acetoxypregnane-3,20-dione 3-propane-1,2-diol monoketal and the like.

As stated in the foregoing, the compounds of the present invention are useful in the preparation of physiologically active hormones such as, for example, Kendall's compound F and acylates thereof.

Compound F acylates are prepared by first treating a 4 - halo - 11β,17α - dihydroxy - 21 - acyloxypregnane-3,20-dione 3-monoketal (Example 3) with an acid in the presence of a nitrogen carbonyl reagent such, as for example, semicarbazide, hydrazine, phenylhydrazine, 2,4-dinitrophenylhydrazine, hydroxylamine, and the like, to cause in a single step (1) removal of the ketal group, (2) formation of a ketonic nitrogen derivative at the 3-position, and (3) dehydrohalogenation at the 4(5)-position. The 4(5)-unsaturated ketonic nitrogen derivative thus-formed, with or without isolation, is then reacted with an exchange reagent capable of entering into an exchange reaction to form a ketonic nitrogen derivative of the exchange reagent and free the 3-keto group of the steroid and yield compound F acylate. Representative exchange reagents are pyruvic acid, 2-ketogluconic acid, glucuronic acid, para-hydroxybenzaldehyde, ortho-hydroxybenzaldehyde, salicylaldehyde, ethylacetoacetate, and the like. Similarly, free compound F is prepared from a 4-halo-11β,17α,21-trihydroxypregnane-3,20-dione 3-monoketal by treatment with an acid in the presence of nitrogen carbonyl reagent, followed by reaction with a ketonic nitrogen derivative exchange reagent.

*Example A.—Kendall's compound F acetate*

A solution of 440 milligrams of 2,4-dinitrophenylhydrazine in three milliliters of acetic acid and three milliliters of water containing 0.2 milliliter of sulfuric acid was prepared by warming the ingredients to about seventy to eighty degrees centigrade. This solution was added to a suspension of 4-chloro-11β,17α-dihydroxy-21-acetoxypregnane-3,20-dione 3-ethylene glycol ketal in five milliliters of acetic acid and in the presence of an atmosphere of nitrogen which was maintained throughout the reaction. The mixture was heated at seventy degrees centigrade for 0.5 hour and was then permitted to stand at room temperature for two hours. Red needles of unsaturated hydrazone crystallized on standing and were redissolved by the addition of ten milliliters of acetic acid and ten milliliters of chloroform. One milliliter of pyruvic acid was added and the reaction mixture heated at fifty degrees centigrade for two hours, after which, two grams of sodium acetate was added and the solution stirred for five minutes. After removal of the solvent under reduced pressure, the residue was triturated three times with chloroform and filtered to remove the insoluble sodium salt of the 2,4-dinitrophenylhydrazone of pyruvic acid. The chloroform solution was washed successively with water, dilute sodium bicarbonate solution, water, and was then dried over sodium sulfate and concentrated to dryness.

For ease of isolation and in order to compensate for any hydrolysis that might have occurred during the reaction, the residue was reacetylated with a mixture of two milliliters of acetic anhydride and two milliliters of pyridine at 26 degrees centigrade for one hour. The excess acetic anhydride was destroyed by the addition of water and the product was extracted with methylene dichloride. The methylene dichloride solution was washed successively with dilute hydrochloric acid, water, dilute sodium bicarbonate solution, water, and was then dried over sodium sulfate and concentrated to dryness. The residue was crystallized from acetone and gave, in two crops, 560 milligrams (71.1 percent) of crude crystalline compound F acetate. The crude crystalline product was recrystallized from fifty milliliters of methanol, after treatment with a decolorizing agent (Darco G–60), to yield 410 milligrams (51.8 percent) of purified compound F. acetate; melting point 208 to 211 degrees centigrade.

*Example B.—Kendall's compound F acetate*

Under an atmosphere of nitrogen, a mixture of one gram of 4-chloro-11β,17α-dihydroxy-21-acetoxypregnane-3,20-dione 3-ethylene glycol ketal, thirty milliliters of acetic acid, six milliliters of water, and 72 milligrams of semicarbazide hydrochloride were heated at seventy degrees centigrade for five hours, after which the solvent was removed by distillation under reduced pressure. The residue was partially dissolved in a mixture of water and ethyl acetate giving 190 milligrams of insoluble material which was isolated by filtration. The organic layer was separated, washed, and evaporated to dryness to give 807 milligrams of an oil. Both the solid material and oil were combined and dissolved in a mixture of twenty milliliters of dioxane, five milliliters of water, two milliliters of pyruvic acid and five drops of acetic acid. This mixture was then heated at 65 degrees centigrade for 1.5 hours, after which the solvent was distilled under reduced pressure and the residue was dissolved in methylene dichloride. After washing and drying, the methylene dichloride solution was evaporated to dryness and the residue was reacetylated with a mixture of three milliliters of pyridine and two milliliters of acetic anhydride. The reacetylated material was worked up as in Example A to give 680 milligrams of crude crystalline compound F acetate.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. 4 - halo - 17α,21 - dihydroxy-11-oxygen-substituted-pregnane-3,20-dione 3-alkylene glycol monoketals and 21-esters thereof having the following general formula:

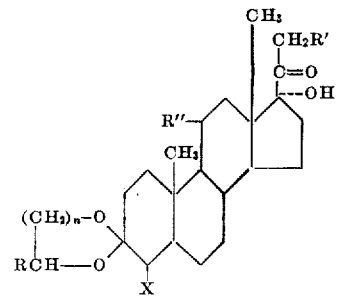

wherein X is a halogen selected from the group consisting of chlorine and bromine, R is selected from hydrogen and lower-alkyl groups, $n$ is an integer from one to two, inclusive, R' is selected from hydroxy and acyloxy groups, the acyl radical radical of which is that of a hydrocarbon monocarboxylic acid containing from one to eight carbon atoms, inclusive, and R'' is selected from α-hydroxy, β-hydroxy and keto groups.

2. 4 - chloro - 11β,17α-dihydroxy-21-acyloxypregnane-3,20-dione 3-alkylene glycol monoketals in which the acyl radical is that of a hydrocarbon monocarboxylic acid containing from one to eight carbon atoms, inclusive.

3. 4 - chloro-11β,17α,21-trihydroxypregnane-3,20-dione 3-alkylene glycol monoketals.

4. 4 - chloro-17α-hydroxy-21-acyloxypregnane-3,11,20-trione 3-alkylene glycol monoketals in which the acyl radical is that of a hydrocarbon monocarboxylic acid containing from one to eight carbon atoms, inclusive.

5. 4 - chloro-17α,21-dihydroxypregnane-3,11,20-trione 3-alkylene glycol monoketals.

6. 4 - chloro-11β,17α-dihydroxy-21-acetoxypregnane-3,20-dione 3-ethylene glycol ketal.

7. 4 - chloro-11β,17α,21-trihydroxypregnane-3,20-dione 3-ethylene glycol ketal.

8. 4 - chloro-17α-hydroxy-21-acetoxypregnane-3,11,20-trione 3-ethylene glycol ketal.

9. 4 - halo - 11β,17α,21-trihydroxypregnane-3,20-dione 3-ethylene glycol monoketals, wherein the halogen is of atomic weight from 35 to 80, which may be represented by the formula:

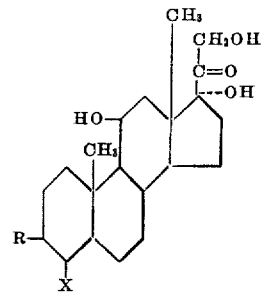

wherein R is an ethylene glycol ketal group and X is halogen as defined above.

No references cited.

UNITED STATES PATENT OFFICE
CERTIFICATE OF CORRECTION

Patent No. 2,791,585                     May 7, 1957

Barney J. Magerlein et al.

It is hereby certified that error appears in the printed specification of the above numbered patent requiring correction and that the said Letters Patent should read as corrected below.

Column 1, line 17, for "-3,21-diones" read -- -3,20-diones --; column 4, line 63, for "hydrochlorite" read -- hypochlorite --; column 6, lines 19 and 20, for "569 milligrams" read -- 560 milligrams --; column 10, line 17, strike out "radical", second occurrence.

Signed and sealed this 1st day of October 1957.

(SEAL)
Attest:
KARL H. AXLINE
Attesting Officer

ROBERT C. WATSON
                                                     Commissioner of Patents